US012110056B2

(12) United States Patent
Gaessler

(10) Patent No.: US 12,110,056 B2
(45) Date of Patent: Oct. 8, 2024

(54) SUPPORT SYSTEM FOR AN ALTERNATIVE FUEL HEAVY VEHICLE

(71) Applicant: Nikola Corporation, Phoenix, AZ (US)

(72) Inventor: Ralf Gaessler, Ulm (DE)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 18/354,384

(22) Filed: Jul. 18, 2023

(65) Prior Publication Data

US 2023/0365195 A1 Nov. 16, 2023

Related U.S. Application Data

(63) Continuation of application No. PCT/IB2022/053409, filed on Apr. 12, 2022, and a
(Continued)

(30) Foreign Application Priority Data

| Jan. 21, 2021 | (IT) | 102021000001037 |
| Jan. 21, 2021 | (IT) | 102021000001040 |
| Apr. 12, 2021 | (IT) | 102021000009110 |

(51) Int. Cl.
 *B62D 21/09* (2006.01)
 *B62D 21/03* (2006.01)

(52) U.S. Cl.
 CPC .............. *B62D 21/09* (2013.01); *B62D 21/03* (2013.01)

(58) Field of Classification Search
 CPC ........ B62D 21/09; B62D 21/02; B62D 21/03; B62D 21/16; B62D 21/17;
(Continued)

(56) References Cited

U.S. PATENT DOCUMENTS 7,108,091 B2 * 9/2006 Guidry .................. B62D 33/02
 180/68.1
7,137,474 B2 * 11/2006 Yokote .................. F17C 13/084
 248/500

(Continued)

FOREIGN PATENT DOCUMENTS

| CN | 110171480 | 8/2019 |
| DE | 102016113759 | 4/2017 |

(Continued)

OTHER PUBLICATIONS

International Searching Authority, International Search Report and Written Opinion dated Feb. 28, 2022 in International Application No. PCT/IB2022/050523.
(Continued)

*Primary Examiner* — Toan C To
(74) *Attorney, Agent, or Firm* — Snell & Wilmer L.L.P.

(57) ABSTRACT

A vehicle provided with a frame (1) comprising two side members (2, 3) connected together at least by a cross member (4), an alternative fuel module (6) and a support system (5) connected to the frame (1) for supporting the alternative fuel module (6), the support system (5) comprising at least a first support element (7) and a second support element (8), both being configured to be fixedly connected to the alternative fuel module (6) via coupling portion (11, 9*b*′), the coupling portion (9*b*′) of the second support element (8) being connected to both the side members (2, 3) and the coupling portion (11) of the first support element (7) being connected to the cross member (4) via a movable connection.

12 Claims, 15 Drawing Sheets

Related U.S. Application Data continuation of application No. PCT/IB2022/050527, filed on Jan. 21, 2022, and a continuation of application No. PCT/IB2022/050523, filed on Jan. 21, 2022.

(58) Field of Classification Search
CPC .... B60K 2015/0636; B60K 2015/0638; B60Y 2200/14; B60Y 2410/11
See application file for complete search history.

(56) References Cited

U.S. PATENT DOCUMENTS

| | | | | |
|---|---|---|---|---|
| 7,303,211 | B2* | 12/2007 | Borroni-Bird | B60K 1/04 280/783 |
| 7,360,816 | B2* | 4/2008 | Chernoff | B60N 2/90 296/35.3 |
| 7,370,886 | B2* | 5/2008 | Luttinen | B60G 7/003 296/205 |
| 8,056,928 | B2* | 11/2011 | Ijaz | B60K 15/013 280/830 |
| 8,944,469 | B2* | 2/2015 | Mulanon | F17C 13/084 280/834 |
| 10,293,684 | B2* | 5/2019 | Sasaki | B60L 50/72 |
| 10,850,610 | B2* | 12/2020 | Matijevich | B60K 15/063 |
| 10,926,628 | B2* | 2/2021 | Otsura | B60K 15/03006 |
| 11,008,041 | B2* | 5/2021 | Inoue | B62D 21/15 |
| 11,299,205 | B2* | 4/2022 | Saje | B62D 27/06 |
| 11,312,229 | B1* | 4/2022 | Yordanov | B32B 15/20 |
| 11,597,439 | B2* | 3/2023 | Calliari | B60D 1/488 |
| 11,780,326 | B2* | 10/2023 | Schlangen | B62D 33/0625 280/80.1 |
| 2002/0171236 | A1* | 11/2002 | Joitescu | B60K 15/07 280/834 |
| 2004/0069545 | A1* | 4/2004 | Chernoff | B62D 63/025 180/65.1 |
| 2006/0027406 | A1* | 2/2006 | Borroni-Bird | H01M 8/04208 280/831 |
| 2006/0061081 | A1* | 3/2006 | Kresse | B60K 15/07 280/834 |
| 2007/0007060 | A1 | 1/2007 | Ono et al. | |
| 2012/0080466 | A1* | 4/2012 | Schultheis | F17C 13/084 224/400 |
| 2014/0196972 | A1* | 7/2014 | Sangha | B62D 21/17 180/309 |
| 2021/0260994 | A1* | 8/2021 | Gambone | B60K 15/067 |

FOREIGN PATENT DOCUMENTS

| | | | | |
|---|---|---|---|---|
| EP | 3683080 | | 7/2020 | |
| WO | WO-2021126455 A1 | * | 6/2021 | ....... B60K 15/03006 |

OTHER PUBLICATIONS

International Searching Authority, International Search Report and Written Opinion dated Mar. 1, 2022 in International Application No. PCT/IB2022/050527.

International Searching Authority, International Search Report and Written Opinion dated Aug. 25, 2022 in International Application No. PCT/IB2022/053409.

* cited by examiner

SUPPORT SYSTEM FOR AN ALTERNATIVE FUEL HEAVY VEHICLE

CROSS-REFERENCE TO RELATED APPLICATIONS

This application is a continuation of PCT application Serial No. PCT/IB2022/050523 filed on Jan. 21, 2022, now publication WO 2022/157690 A1 entitled "Support System for an Alternative Fuel Heavy Vehicle." PCT/IB2022/050523 claims priority to Italian patent application No. 102021000001037 filed on Jan. 21, 2021.

This application is also a continuation of PCT application Serial No. PCT/IB2022/050527 filed on Jan. 21, 2022, now publication WO 2022/157693 A1 entitled "Support System for an Alternative Fuel Heavy Vehicle." PCT/IB2022/050527 claims priority to Italian patent application No. 102021000001040 filed on Jan. 21, 2021.

This application is also a continuation of PCT application Serial No. PCT/IB2022/053409 filed on Apr. 12, 2022, now publication WO 2022/219517 A1 entitled "Support System for an Alternative Fuel Heavy Vehicle." PCT/IB2022/053409 claims priority to Italian patent application No. 102021000009110 filed on Apr. 12, 2021.

The disclosures of each of the foregoing applications are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure concerns support systems for a vehicle, in particular support systems for alternative fuel heavy vehicles such as a fuel cell vehicle.

BACKGROUND

Alternative fuel heavy vehicles frequently utilize heavy and delicate powertrain components such as batteries or fuel cell devices to provide the force required for traction of the vehicle. Such elements may be housed in the front portion of the vehicle, i.e. in the space traditionally occupied by the internal combustion engine, and/or in a rear portion of the vehicle. In any case, they are housed between and supported by the longitudinal members of the frame. However, it is known that the frame has a rigidity that may be increasingly varied by the fixing of the alternative fuel elements thereby leading to potential issues regarding vehicle stability and maneuverability. Moreover, the torsional moments and longitudinal accelerations may damage the alternative fuel elements carried by the frame. Accordingly, systems for supporting alternative fuel powertrain elements to reduce or eliminate the aforementioned drawbacks may be desirable. An aim of the present disclosure is to satisfy the above mentioned needs in a cost effective and optimized way.

SUMMARY

In an exemplary embodiment, a vehicle having a frame comprises: two side members connected together by a cross member, an alternative fuel module, and a support system connected to the two side members. The support system comprises a first support element and a second support element, both the first and the second support elements fixedly connected to the alternative fuel module via a coupling portion. The coupling portion of the second support element is fixedly connected to the two side members, and the coupling portion of the first support element is connected to the cross member by a movable connection.

In another exemplary embodiment, a vehicle having a frame comprises: two side members connected together by a cross member, an alternative fuel module, and a support system connected to the frame for supporting the alternative fuel module. The support system comprises a first support element and a second support element, both the first support element and the second support element fixedly connected to the alternative fuel module via a respective coupling portion. The coupling portion of the second support element is connected via an elastic connection to the two side members, and the coupling portion of the first support element is connected to the cross member via a movable connection.

In another exemplary embodiment, a vehicle having a frame comprises: two side members, a cross member connected to the two side members, an alternative fuel module, and a support system connected to the frame and the alternative fuel module. The support system comprises at least a first support element and a second support element each fixedly connected to the alternative fuel module via a respective coupling portion. The coupling portion of the second support element is connected to the two side members. The coupling portion of the first support element is connected to the cross member via a movable connection, and the movable connection comprises a ball joint connected via a support portion to the cross member.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
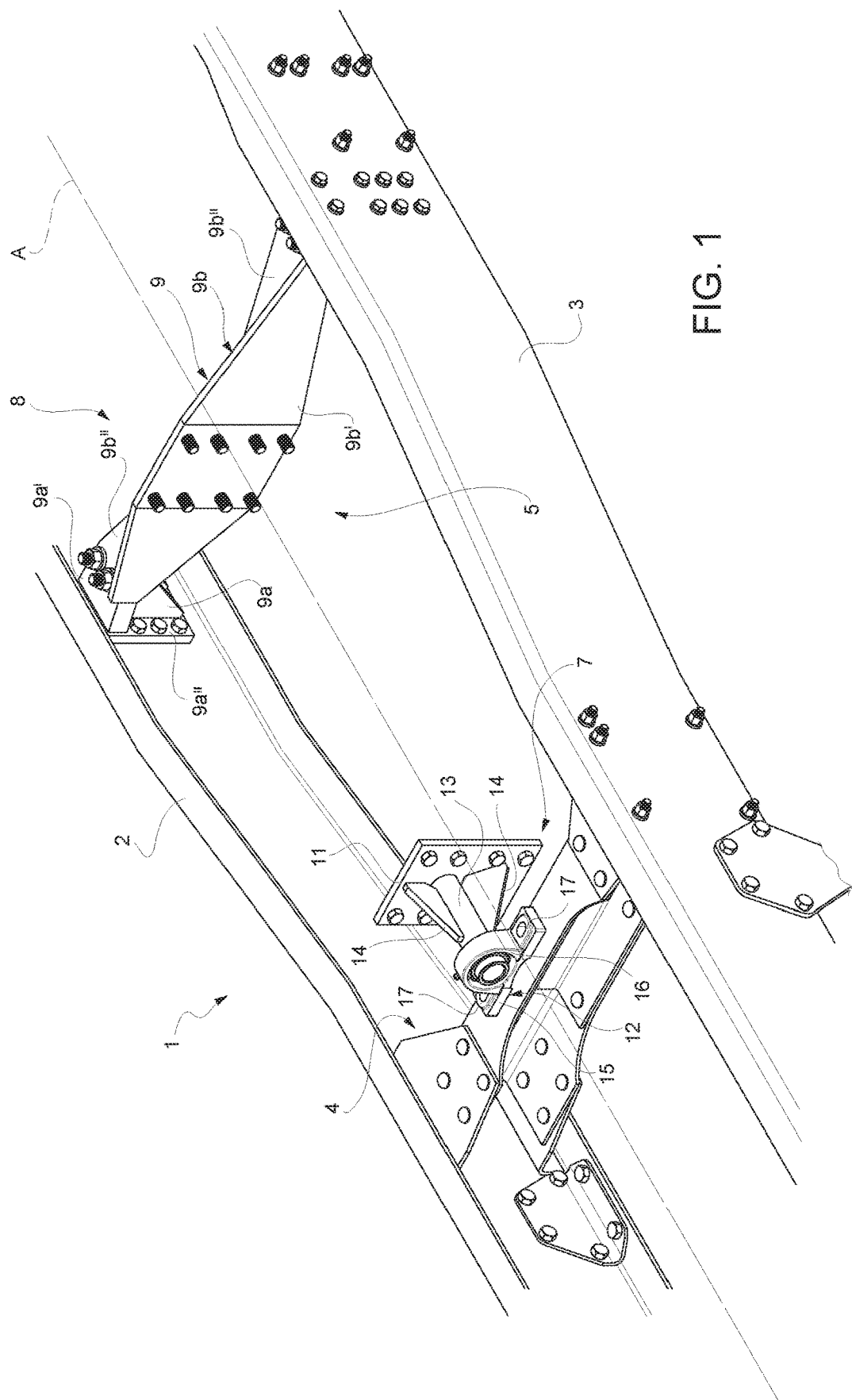
FIG. 1 is a perspective view showing a portion of a vehicle, with parts removed for sake of clarity, comprising a support system in accordance with the present disclosure.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of the disclosure, are to be considered within the scope of the disclosure.

It is to be understood that this disclosure is not limited to the particular configurations, process steps, and materials disclosed herein as such configurations, process steps, and materials may vary. It is also to be understood that the terminology employed herein is used for the purpose of describing particular embodiments only and is not intended to be limiting. In describing the disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

With initial reference to FIG. 1, a frame 1 for a heavy vehicle (not shown for sake of clarity) such as a commercial vehicle, e.g. a truck, is illustrated.

In various embodiments, frame 1 comprises a pair of side members 2, 3 extending parallel to a longitudinal axis A of the vehicle and laterally spaced one with respect to the other.

In various embodiments, side members 2, 3 may, for example, be connected by at least a cross member 4 extending transversally with respect to axis A and fixed to its extremities to the side members. The cross member 4 may be of any typology and shape according to the dimension and load of the vehicle.

Frame 1 may include a support system 5 for supporting an alternative fuel module 6, e.g. a fuel cell module, configured to provide the energy needed to the operation of the vehicle.

In various embodiments, support system 5 comprises a first support element 7 and a second support element 8 that are configured to connect the alternative fuel module 6 to chassis 1 via a three-points connection. In the described embodiments the second support element 8 is placed in a front portion of the vehicle along axis A and according to its motion direction and the first support element 7 is placed in a rear portion. Clearly, they may be inversed according to vehicle necessity.

First support element 7 may, for example, connect a coupling portion, fixable to the alternative fuel module 6, via a movable connection to the cross member 4 while the second support element 8 connects a coupling portion, fixable to the alternative fuel module 6, to the side members 2, 3.

In various embodiments, the second support element 8 is a transversal member 9 comprising a pair of lateral elements 9a and an intermediate member 9b. The lateral elements 9a defines a cantilevered support portion 9a' that is supported by a flanged portion 9a" fixed to the respective side member 2, 3. In particular, the flanged portion 9a" is fixed to the side member 2, 3 via fixing means such as threaded elements, e.g. bolts.

Intermediate member 9b may be fixed on the cantilevered support portion 9a' of the lateral elements 9a via fixing means such as threaded elements, e.g. bolts. In particular, the intermediate member 9b comprises a coupling plate 9b' that is configured to be coupled, e.g. via fixing means such as threaded elements, to the alternative fuel module 6.

The coupling plate 9b' may, for example, be substantially plate and extend on a vertical plane, i.e. a plane orthogonal with respect to longitudinal axis A. Moreover, the coupling plate 9b' has a central portion that is substantially rectangular, e.g. squared and a pair of lateral portion that are tapered in a way to decrease their thickness when approaching to the respective side member 2, 3. In particular, the lateral portions are inclined with respect to axis A while the central portion is perpendicular to this latter (see FIGS. 2, 5 and 8).

In various embodiments, intermediate member 9b furthermore comprises a pair of reinforcing plates 9b" configured to strengthen the coupling plate 9b'. In particular, each reinforcing plate 9b" comprises a substantially triangular plate that extends, tapered, from the respective side member 2, 3 towards the central portion of the coupling plate 9b'. Reinforcing plates 9b" and the coupling plate 9b' may comprise a single piece.

Reinforcing plates 9b" may be placed in a plane perpendicular with respect to coupling plate 9b', i.e. parallel to the plane containing the cantilevered portion 9a' of lateral elements 9a. Accordingly, the intermediate member 9b is fixed to the flanged portion 9a" via the respective reinforcing plate 9b" preferably via a threaded connection, e.g. by bolts.

Figure 2:
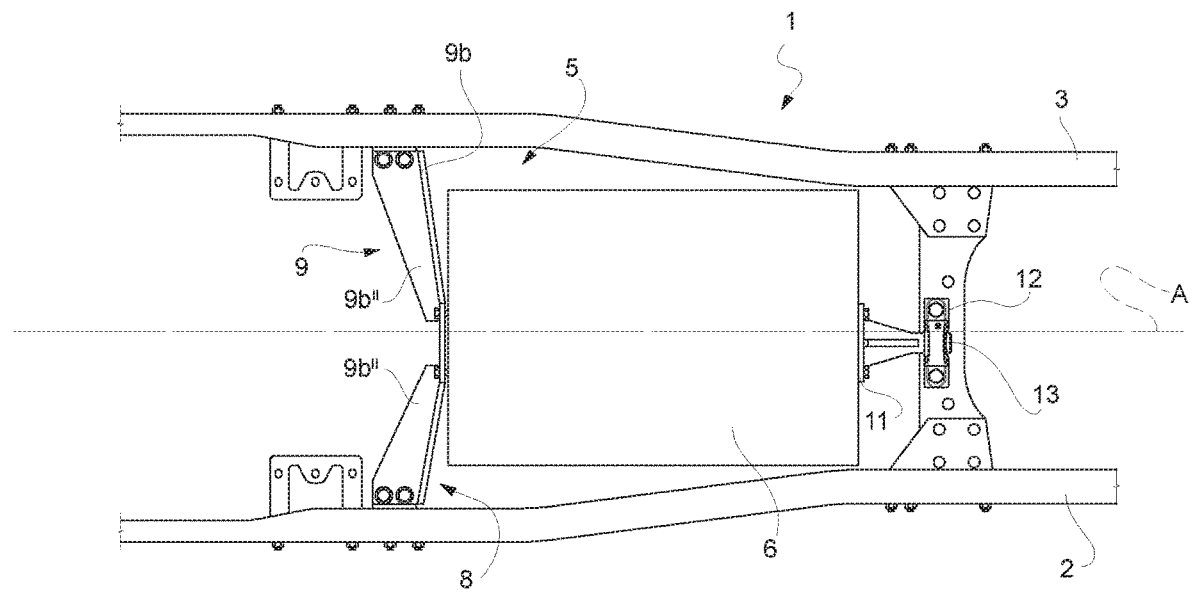
FIG. 2 is a top view showing the vehicle of FIG. 1.
Figure 3:
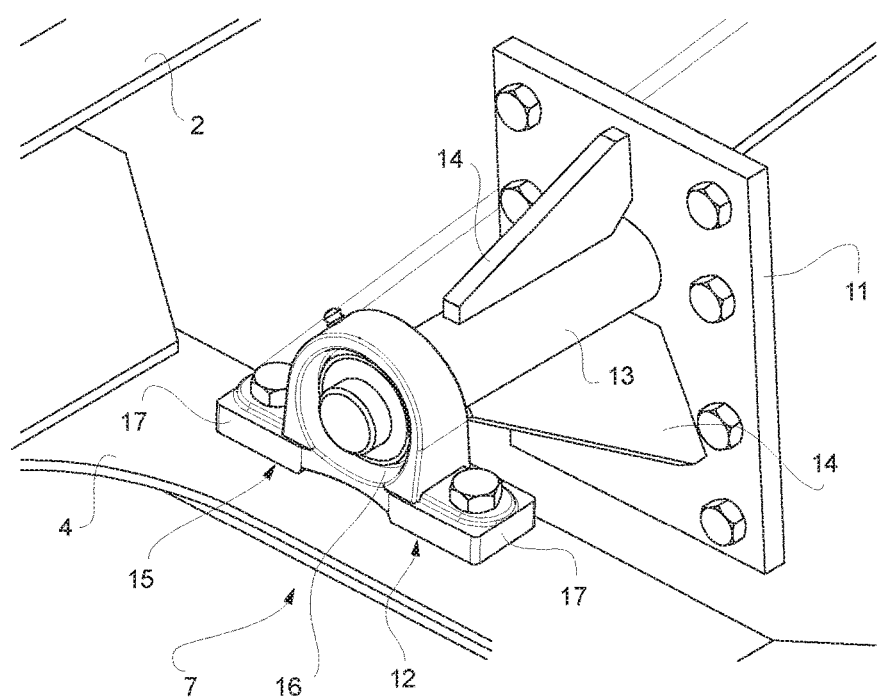
FIG. 3 is a perspective view showing an enlarged view of an element of the support system of FIG. 1.

In various embodiments, as shown in FIGS. 1 to 3, the first support element 7 comprises a coupling plate 11 configured to be fixed to the alternative fuel module 6 and a support bearing 12 configured to be fixed to cross member 4 and to support in a rotatably free manner the coupling plate 11.

Coupling plate 11 may, for example, be fixed to the alternative fuel module 6 via fixing means such as a threaded connection, e.g. by bolts and is coupled to support bearing 12 via a shaft 13 that is fixedly engaged to the coupling plate 11. In particular, the shaft 13 extends perpendicularly from plate 11 on the opposite side with respect to alternative fuel module and has preferably a cylindrical shape, more preferably hollow. Preferably, shaft 13 and plate 11 are monolithic and may be furthermore connected together via ribs 14 configured to increase the coupling of shaft 13 with plate 11.

In various embodiments, support bearing 12 comprises a plummer block 15 defining an opening 16 wherein the shaft 13 may be accommodated and supported in a rotatably free manner, as per se known. For example, the plummer block 15 may have a "Omega" shape, i.e. comprises a pair of legs 17 configured to allow the fixation of plummer block 15 to the cross member 4.

Figure 4:
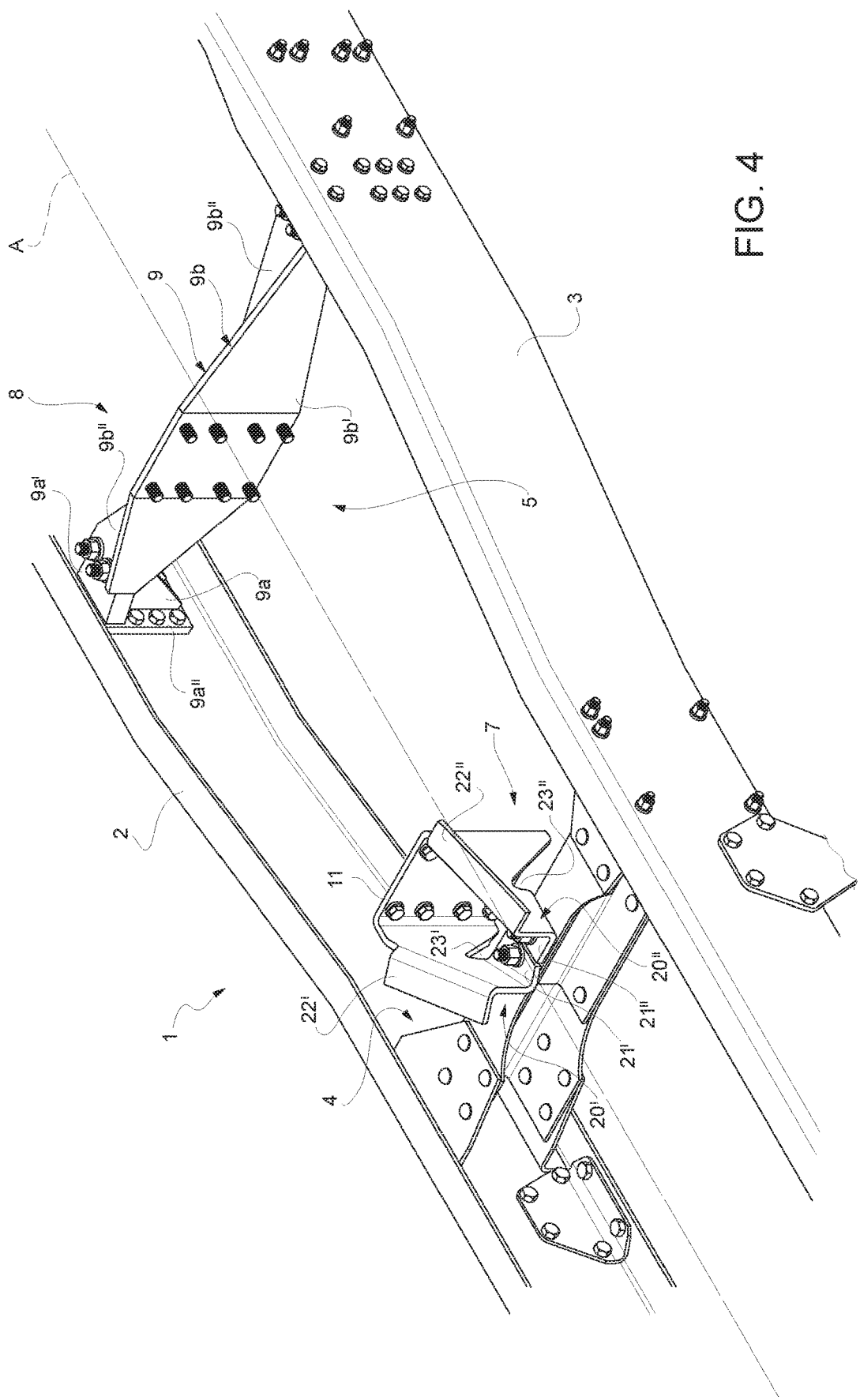
FIG. 4 is a perspective view showing a portion of a vehicle, with parts removed for sake of clarity, comprising a support system in accordance with various embodiments.
Figure 5:
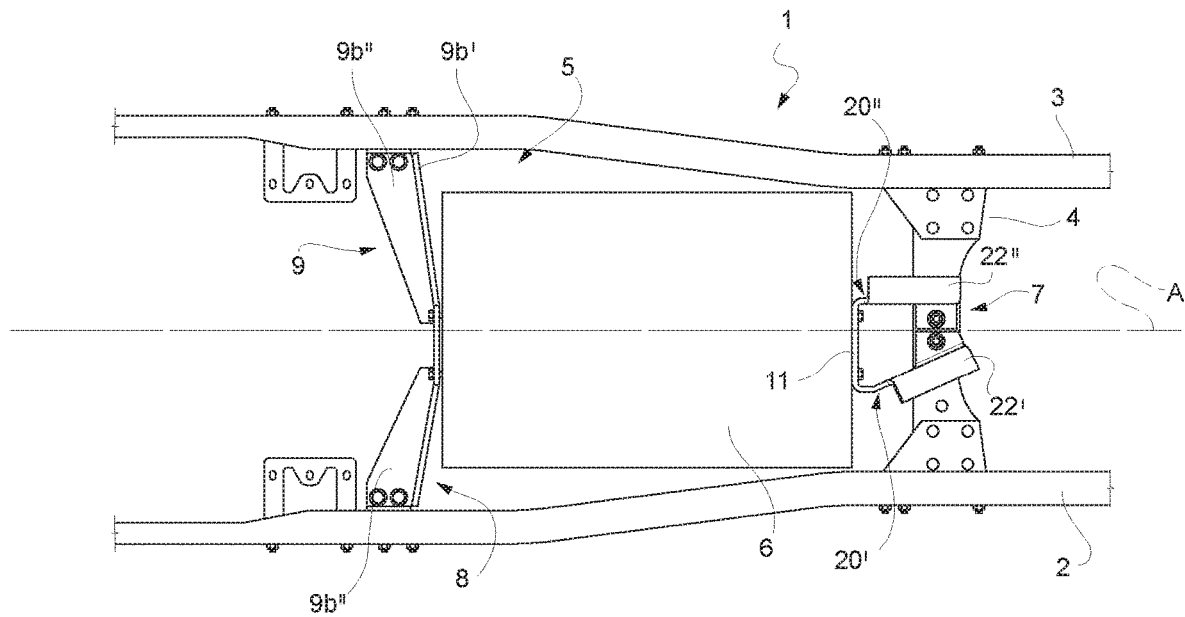
FIG. 5 is a top view showing the vehicle of FIG. 4.
Figure 6:
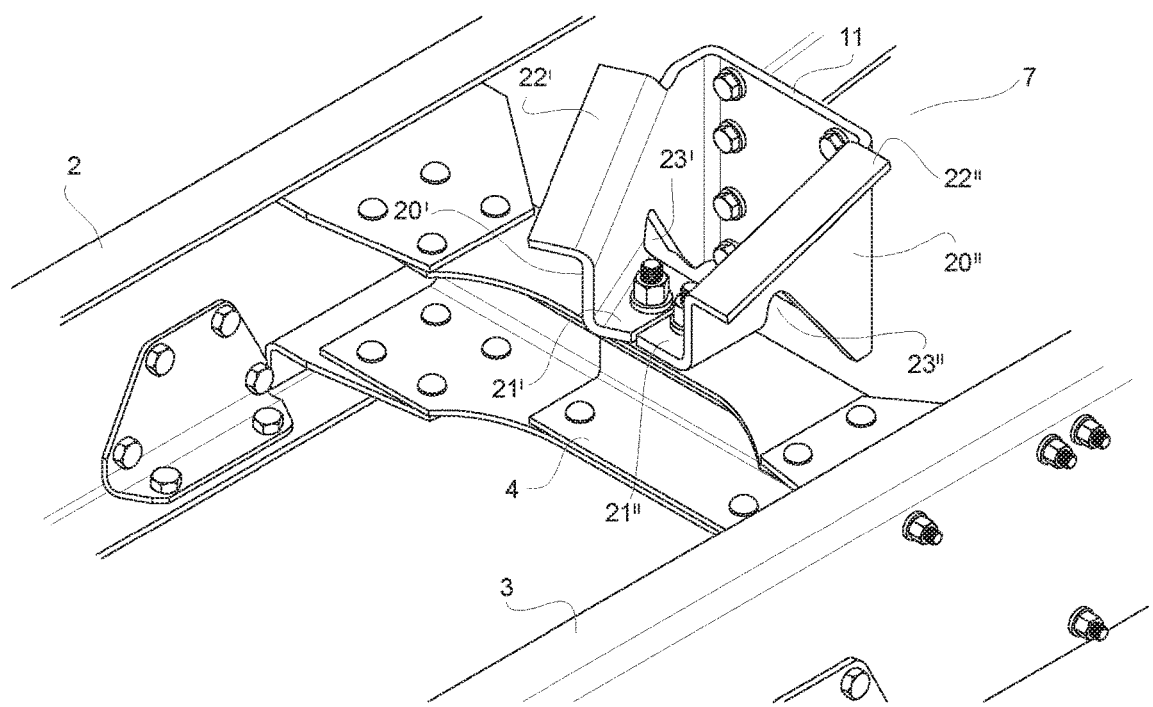
FIG. 6 is a perspective view showing an enlarged view of an element of the support system of FIG. 4.

In various embodiments, with reference to FIGS. 4, 5, and 6, the first support element 7 comprises a coupling plate 11 configured to be fixed to the cross member via a pair of torsion walls 20', 20".

Torsion walls 20', 20" may, for example, extend along axis A from coupling plate 11 in a direction opposite to the second support element 8. Preferably, torsion walls 20', 20" are realized as one piece with coupling plate 11.

In various embodiments, one or more torsion walls 20' extends inclined with respect to axis A while one or more torsion walls 20" extend parallel to this latter. Accordingly, the two plates 20', 20" are not parallel one with respect to the other and they are closer in their respective portion positioned above the cross member 4.

Each torsion wall 20', 20" furthermore may comprise a coupling portion 21', 21" that extends over the cross member 4 and is configured to allow the connection of each torsion wall 20', 20" to the cross-member 4. In particular such coupling portion 21', 21" is a flat portion configured to allow the connection via fixing means, e.g. defining holes that may house threaded elements such as bolts.

Each torsion walls 20', 20" may further comprise a bent portion 22', 22" that extends along an upper edge of the torsion wall 20', 20", preferably along its entire extension. Such bent portion 22', 22" extends inclined with respect to the torsion wall 20', 20", in particular, in a direction opposite to the torsion walls 20', 20". In particular the shape may be varied to increase the stiffness of the torsion walls 20', 20".

The torsion walls 20', 20" have a general tapered cross section, in particular their thickness in a vertical direction decreases from the coupling plate 11 to the coupling portions 21', 21". In particular each torsion wall 20', 20" is shaped with an intermediate groove 23', 23" that divides a wider vertical portion with respect to a thinner vertical portion of the torsion walls 20', 20".

In various embodiments, torsion walls 20', 20" and coupling plate 11 may be realized as a single piece, e.g. via a single metal sheet or by forging.

Figure 7:
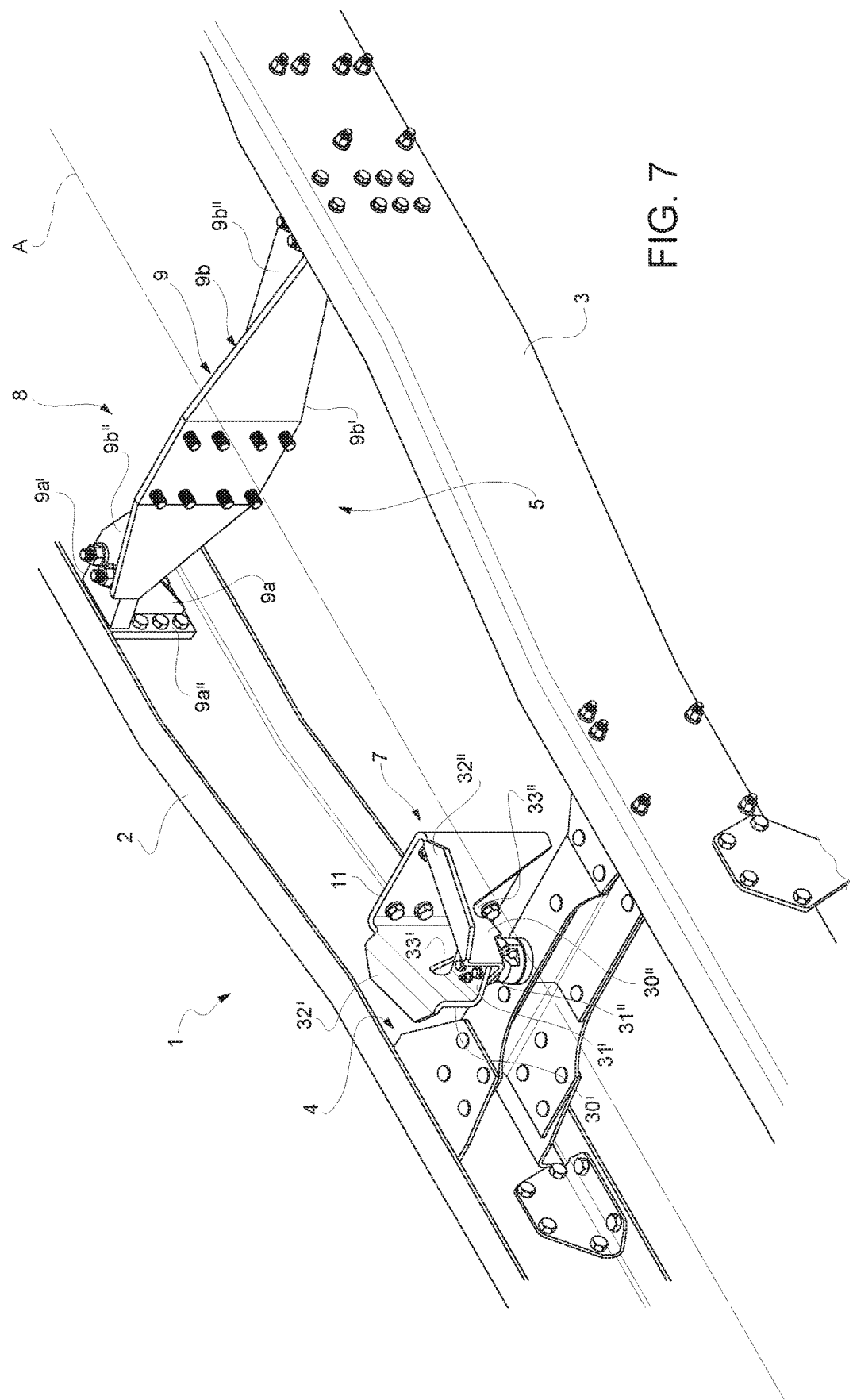
FIG. 7 is a perspective view showing a portion of a vehicle, with parts removed for sake of clarity, comprising a support system in accordance with various embodiments.
Figure 8:
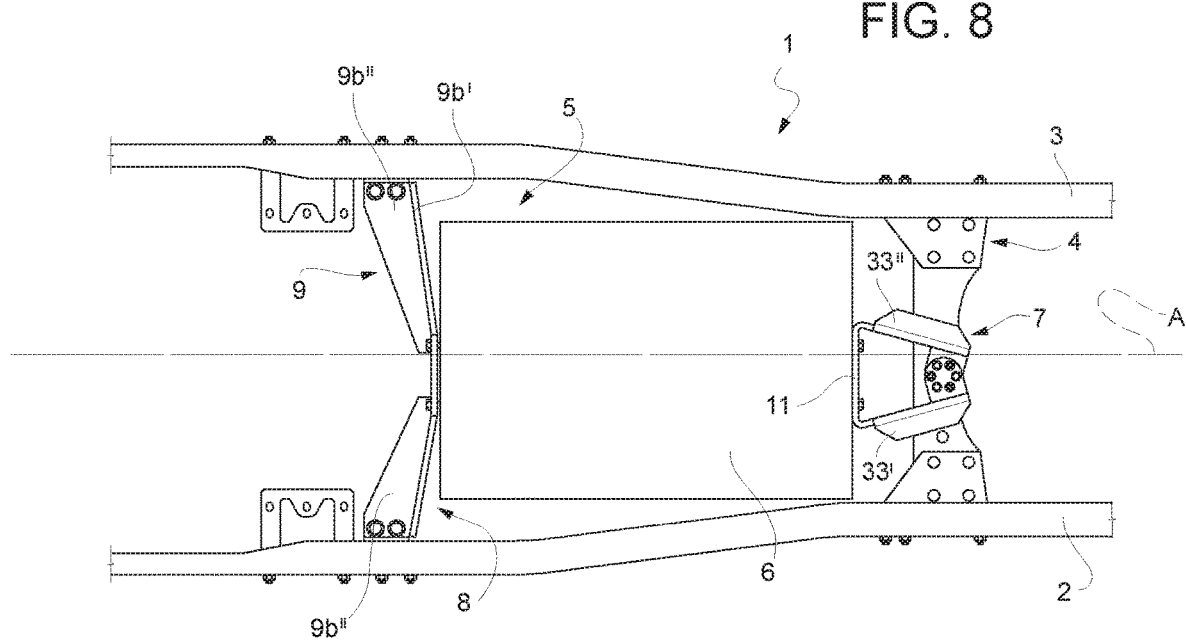
FIG. 8 is a top view showing the vehicle of FIG. 7.
Figure 9:
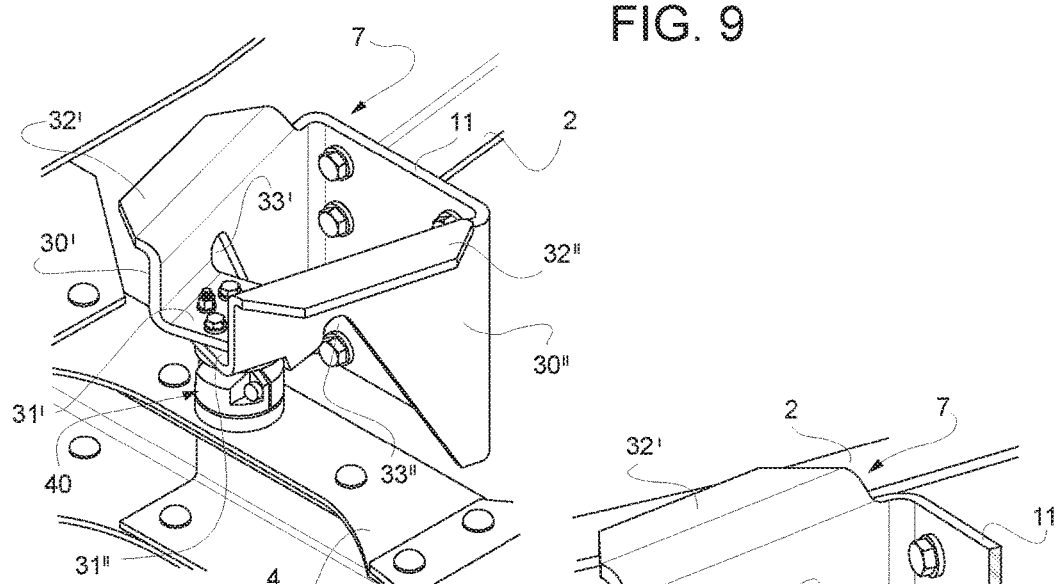
FIG. 9 is a perspective view showing an enlarged view of an element of the support system of FIG. 7.
Figure 10:
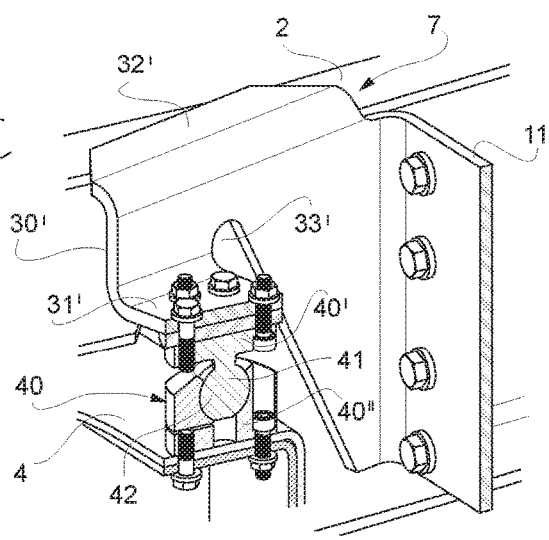
FIG. 10 is a perspective sectional view of the element of FIG. 9.

With reference to FIGS. 7, 8, and 9, in various embodiments, the first support element 7 comprises a coupling plate 11 configured to be fixed to the cross member via a pair of torsion walls 30', 30" and a ball joint 40.

Torsion walls 30', 30" may, for example, extend along axis A from coupling plate 11 in a direction opposite to the second support element 8. In various embodiments, torsion walls 30', 30" are realized as one piece with coupling plate 11. Further, torsion walls 30', 30" may be parallel one with to the other, i.e. they are symmetric with respect to axis A.

Each torsion wall 30', 30" may further comprise a coupling portion 31', 31" that extends over the ball joint 40 and is configured to allow the connection of each torsion wall 30', 30" to the ball joint 40. In particular such coupling portion 31', 31" is a flat portion configured to allow the connection via fixing means, e.g. defining holes that may house threaded elements such as bolts.

In various embodiments, the coupling portions 31', 31" extend from the torsion wall 30', 30" inclined with respect to axis A and at different heights so that they are superimposed one with respect to the other. In particular, in the disclosed embodiment, the coupling portion 31' of one 30' of the torsion walls is above the coupling portion 31" of the other 30" of the torsion walls.

Each torsion walls 30', 30" may further comprise a bent portion 32', 33" that extends along an upper edge of the torsion wall 30', 30", preferably along its entire extension. Such bent portion 32', 32" extends inclined with respect to the torsion wall 30', 30", in particular, in a direction opposite to the torsion walls 30', 30". Shape of bent portion may be varied to increase the stiffness of torsion walls 30', 30".

Each torsion wall 30', 30" may be shaped with an intermediate groove 33', 33" that divides a wider vertical portion with respect to a thinner vertical portion of the torsion wall 30', 30". In various embodiments, torsion walls 30', 30" and coupling plate 11 may be realized via a single metal sheet.

Ball joint 40 may comprise an upper portion 40' that is fixedly carried by coupling portions 21', 21" and a lower portion 40" that is carried by cross member 4. One between the upper or the lower portions 40', 40" carries a sphere 41 that is configured to be housed in a seat 42 realized in the other between the upper or the lower portions 40', 40". In particular, as disclosed, the sphere 41 may be carried by the upper portion 40' and the seat 42 may be carried by the lower portion 40".

The operation of the support system 5 as described in the various embodiments is the following: in general, the second support element 8 supports the weight of the alternative fuel module 6 while the first support element 7, while supporting the weight of the module, further avoids that torque and/or acceleration transmitted by frame 1 may damage alternative fuel module 6.

In various embodiments, the support bearing 12 allows the possible rotation of alternative fuel module 6 and its partial movement along axis A thereby absorbing such forces and torques transmitted by frame 1. In particular, the first support element 7 connects a coupling portion, fixable to the alternative fuel module 6, via a movable connection to the cross member 4 while the second support element 8 connects a coupling portion, fixable to the alternative fuel module 6, to the side members 2, 3 via a elastic connection.

Figure 11:
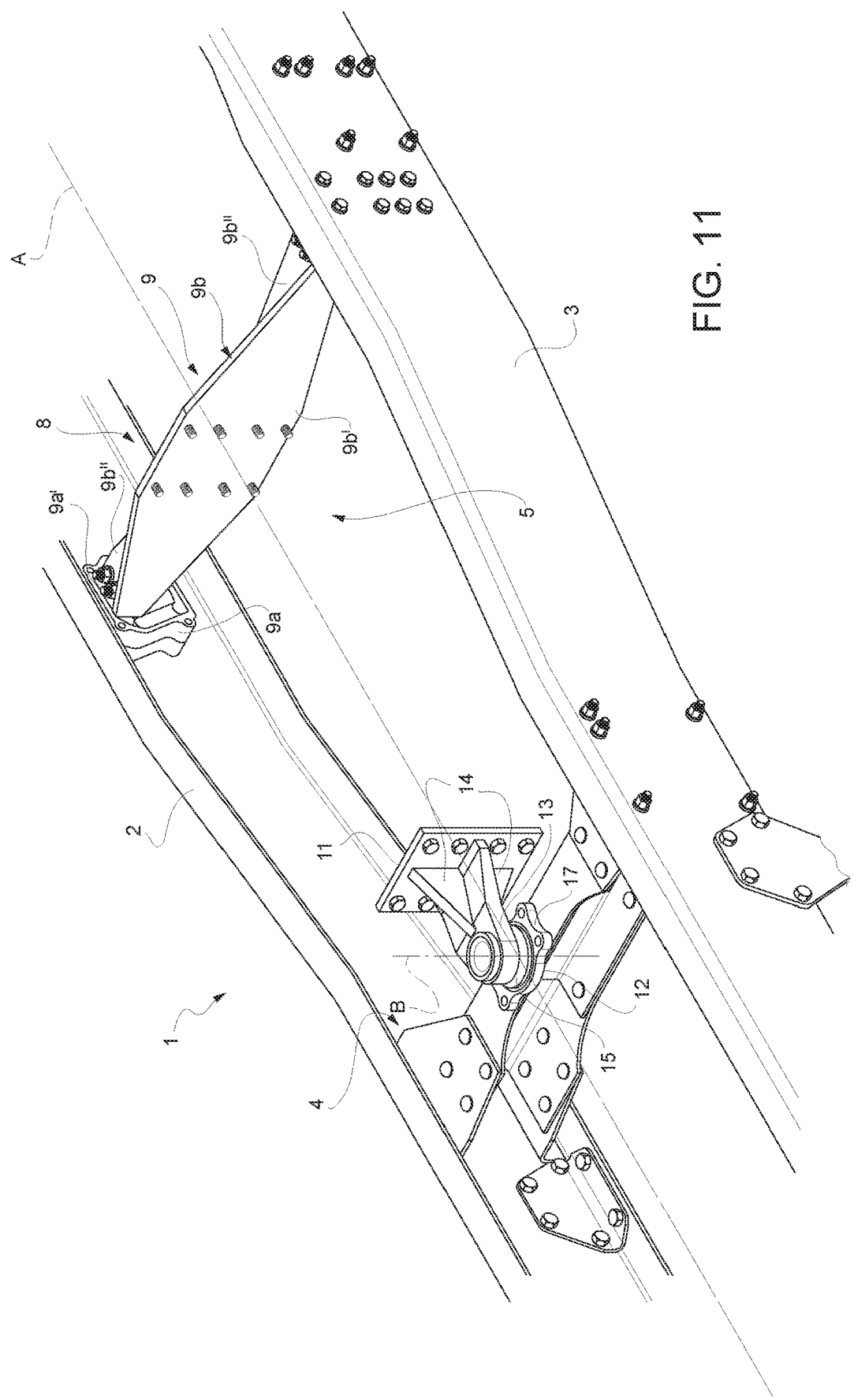
FIG. 11 is a perspective view showing a portion of a vehicle, with parts removed for sake of clarity, comprising a support system in accordance with various embodiments.
Figure 12:
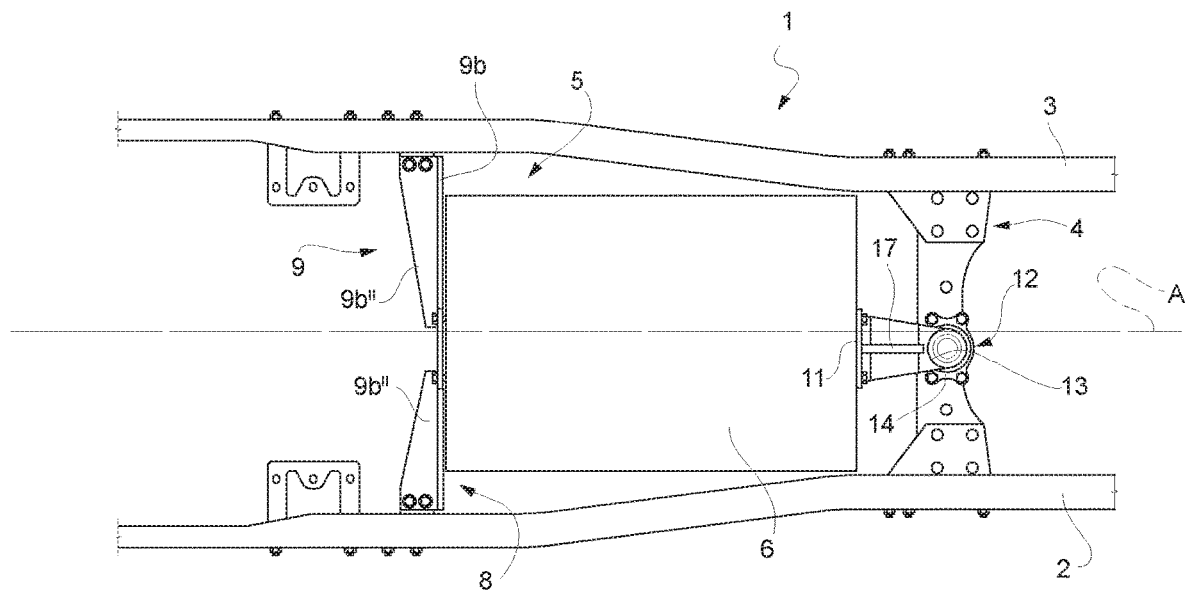
FIG. 12 is a top view showing the vehicle of FIG. 11.
Figure 14:
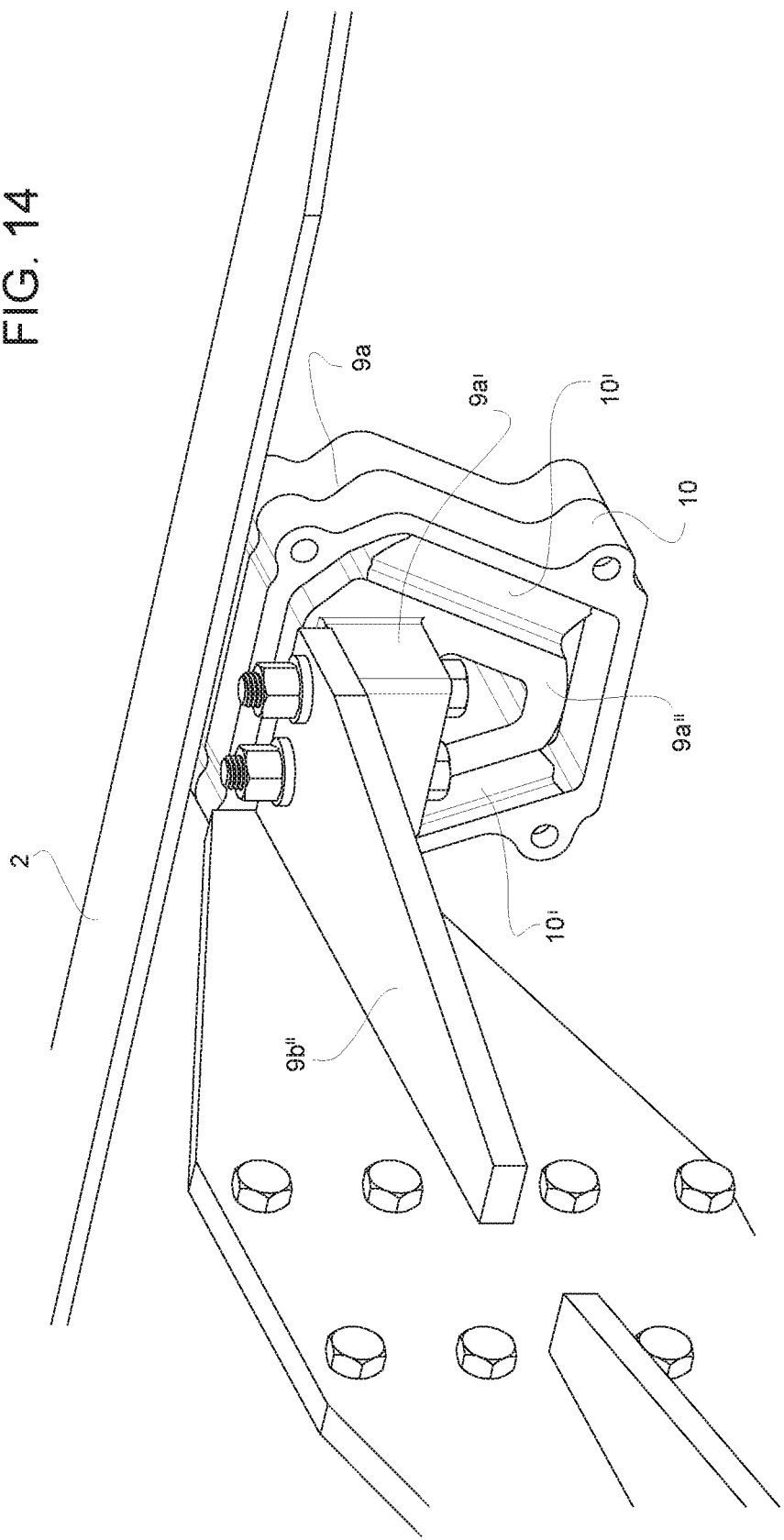
FIG. 14 is a perspective view showing an enlarged view of another element of the support system of FIG. 11.
Figure 15:
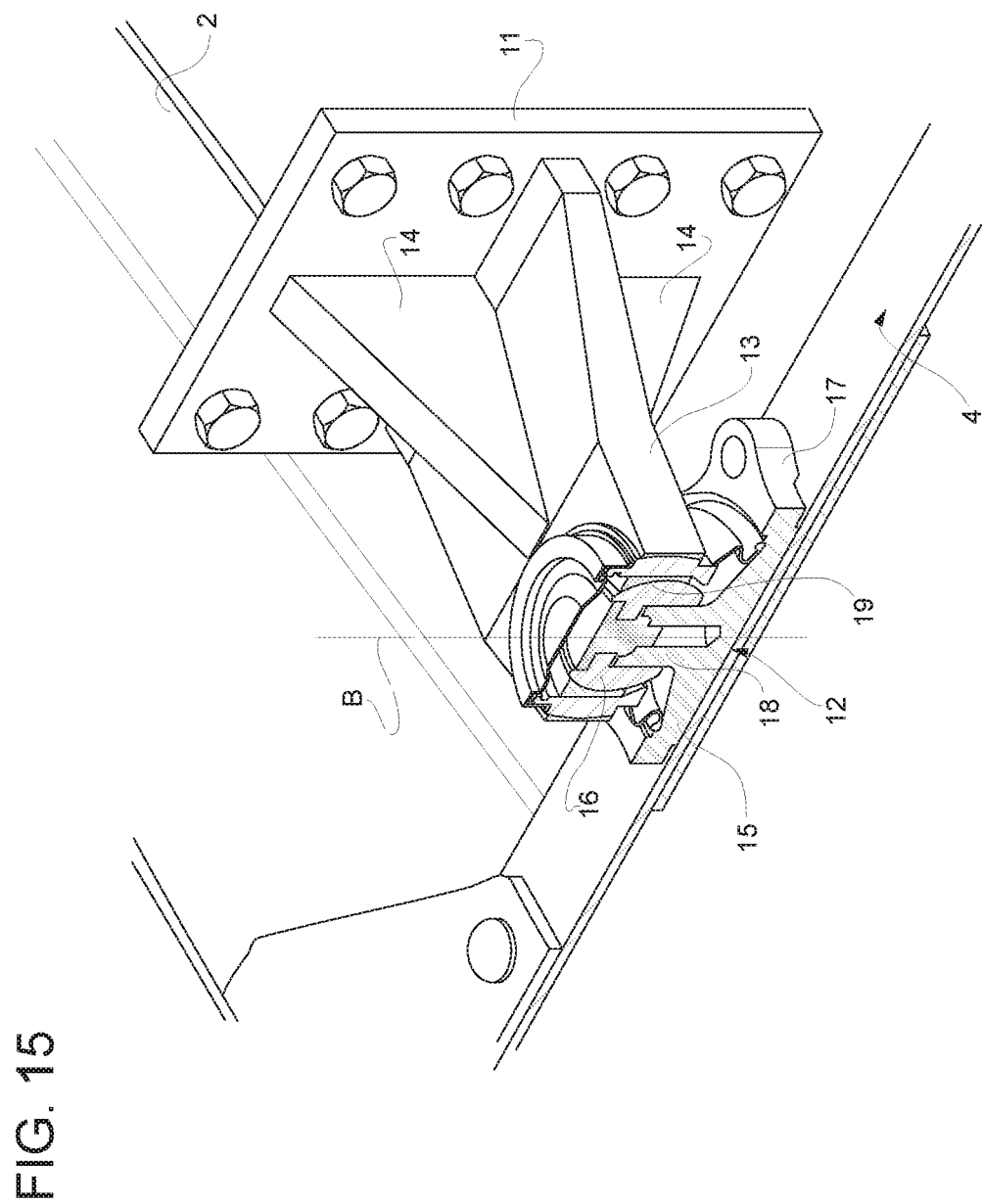
FIG. 15 is a perspective sectioned view showing an enlarged view of the element of FIG. 13.

With initial reference to FIGS. 11, 12, and 14, in various embodiments, a second support element 8 comprises a cross member 9 comprising a pair of lateral elements 9a and an intermediate member 9b.

The lateral elements 9a defines a cantilevered support portion 9a' that is supported by a flanged portion 9a". In particular, as shown in detail in FIG. 14, the flanged portion 9a" is carried by a fixing portion 10 that is fixed to the side member 2, 3 via fixing means such as threaded elements, e.g. bolts.

Fixing portion 10 may, for example, comprise a shape that is hollow and circumferentially extends around the flanged portion 9a". In detail, this latter has substantially trapezoidal shape and the fixing portion 10 has a similar shape so as to internally contain the flanged portion 9a".

The fixing portion 10 may be elastically connected to flanged portion 9a" via a plurality of ribs 10' that connects the flanged portion 9a to fixing portion 10. In particular, according to the above described shape, the ribs are realized on the inclined edges of the trapezoidal shape.

In various embodiments, fixing portion 10, ribs 10' and flanged portion 9a" are all realized in one piece, preferably via a sheet metal element or as a casted element.

The intermediate member 9b may, for example, be fixed on the cantilevered support portion 9a' of the lateral elements 9a via fixing means such as threaded elements, e.g. bolts. In particular, the intermediate member 9b comprises a coupling plate 9b' that is configured to be coupled, e.g. via fixing means such as threaded elements, to the alternative fuel module 6.

The coupling plate 9b' may be substantially plate and extend on a vertical plane, i.e. a plane orthogonal with respect to longitudinal axis A. Moreover, the coupling plate 9b' may have a central portion that is substantially rectangular, e.g. squared and a pair of lateral portion that are tapered in a way to decrease their thickness when approaching to the respective side member 2, 3. In particular, the lateral portions may be inclined with respect to axis A while the central portion is perpendicular to this latter (see FIG. 12).

Intermediate member 9b may further comprise a pair of reinforcing plates 9b" configured to strengthen the coupling plate 9b'. In various embodiments, each reinforcing plate 9b" comprises a substantially triangular plate that extends, tapered, from the respective side member 2, 3 towards the central portion of the coupling plate 9b'. Reinforcing plates 9b" and the coupling plate 9b' may be made as a single piece.

Reinforcing plates 9b" may be placed in a plane perpendicular with respect to coupling plate 9b', i.e. parallel to the plane containing the cantilevered portion 9a' of lateral elements 9a. In such embodiments, the intermediate member 9b is fixed to the flanged portion 9a" via the respective reinforcing plate 9b" preferably via a threaded connection, e.g. by bolts.

Figure 13:
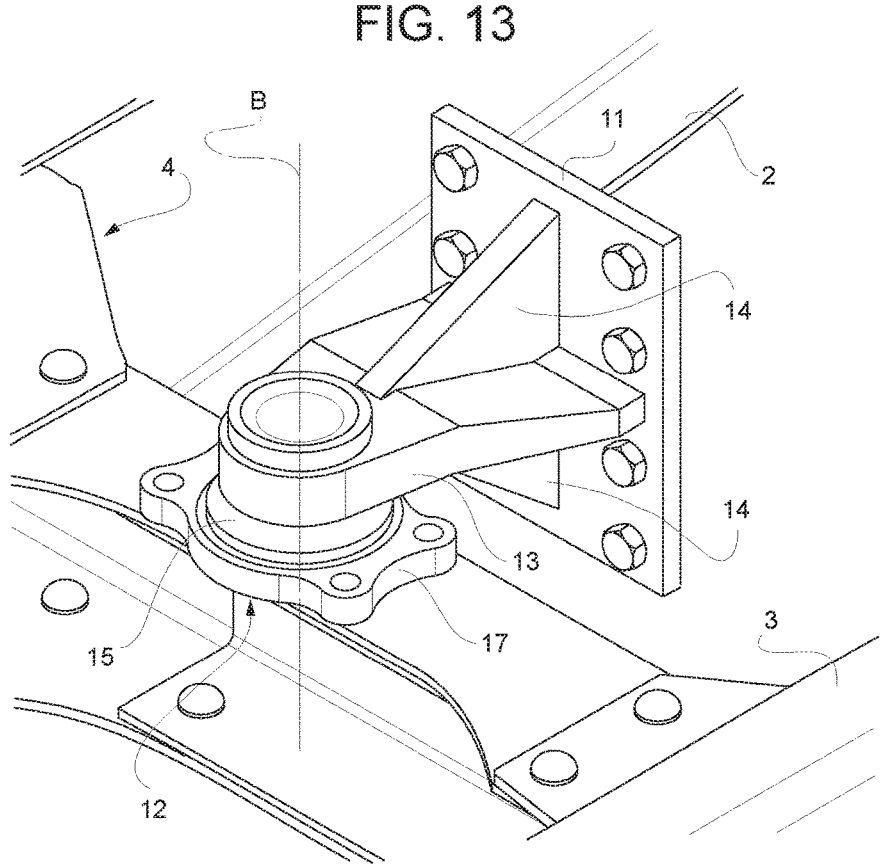
FIG. 13 is a perspective view showing an enlarged view of an element of the support system of FIG. 11.

With reference to FIGS. 11, 12, and 13, the first support element 7 comprises a coupling plate 11 configured to be fixed to the alternative fuel module 6 and a support bearing 12 configured to be fixed to cross member 4 and to support in a rotatably free manner the coupling plate 11.

In various embodiments, the coupling plate 11 may be fixed to the alternative fuel module 6 via fixing means such as a threaded connection, e.g. by bolts and it is coupled to support bearing 12 via a flange 13 that is fixedly engaged to the coupling plate 11.

Flange 13 may, for example, extend substantially perpendicularly from plate 11 on the opposite side with respect to alternative fuel module and is substantially plate. In various embodiments, flange 13 and plate 11 are monolithic and may be connected together via ribs 14 configured to increase the coupling of flange 13 with plate 11.

The support bearing 12 may, for example, comprise a ball joint 15. In particular, the ball joint 15 may comprise a sphere 16 that is carried by a support 17 that is fixable to cross member 4, e.g. via threaded elements.

In various embodiments, sphere 16 is carried by a pin 18 extending by support 17 and allowing the sphere 16 to be carried about a rotational axis B, for example, a vertical axis, i.e. perpendicular to axis A and to ground. The sphere is housed in a sliding way in an opening 19 that is made in an extremity of arm 13. The sphere 16 is therefore configured to allow the rotation about axis B and in all possible rotational direction transversal thereto thanks to the sliding of its surface in opening 19.

In various embodiments, the second support element 8 and the first support element 7 support the weight of the alternative fuel module 6 avoids that torque and/or acceleration transmitted by frame 1 may damage the same. Support bearing 12 may, for example, allow the possible rotation of alternative fuel module 6 while the fixing portion 10 provide improved elasticity.

Figure 16:
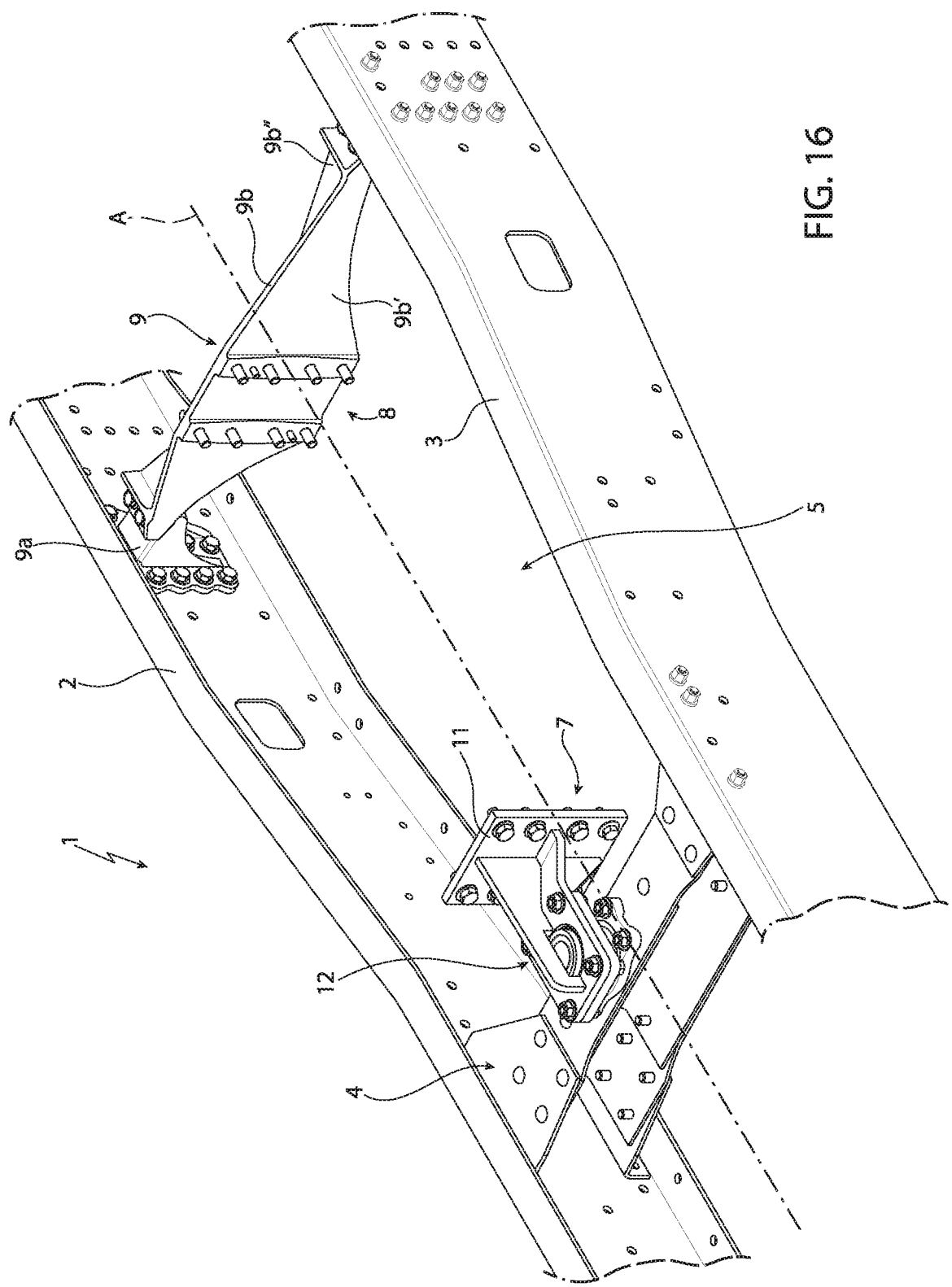
FIG. 16 is a perspective view showing a portion of a vehicle, with parts removed for sake of clarity, comprising a support system in accordance with various embodiments.
Figure 17:
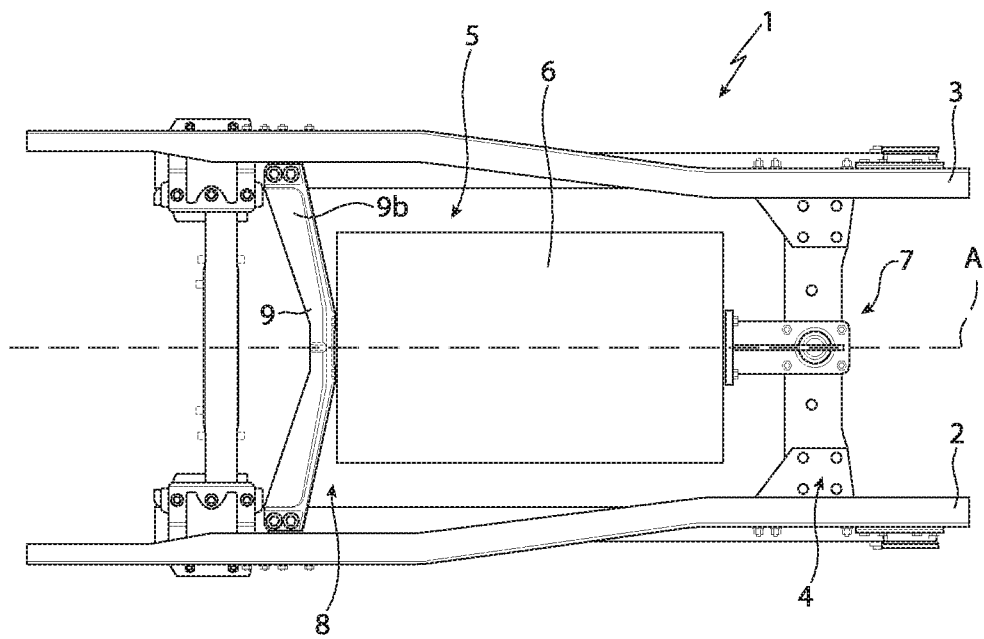
FIG. 17 is a top view showing the vehicle of FIG. 16.
Figure 18:
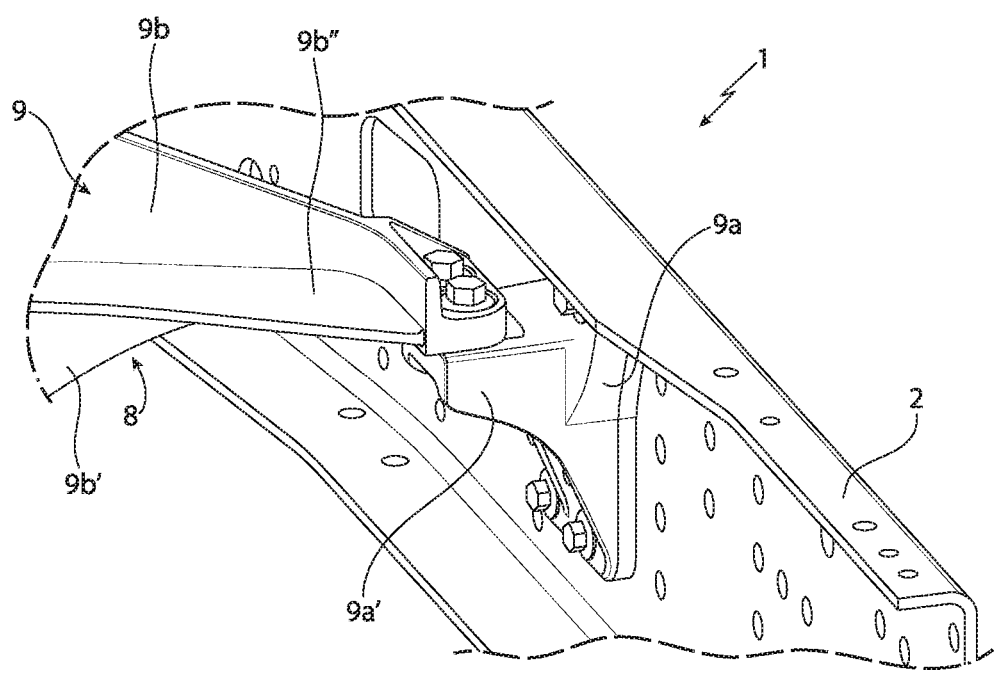
FIG. 18 is a perspective view showing an enlarged view of an element of the support system of FIG. 16.
Figure 19:
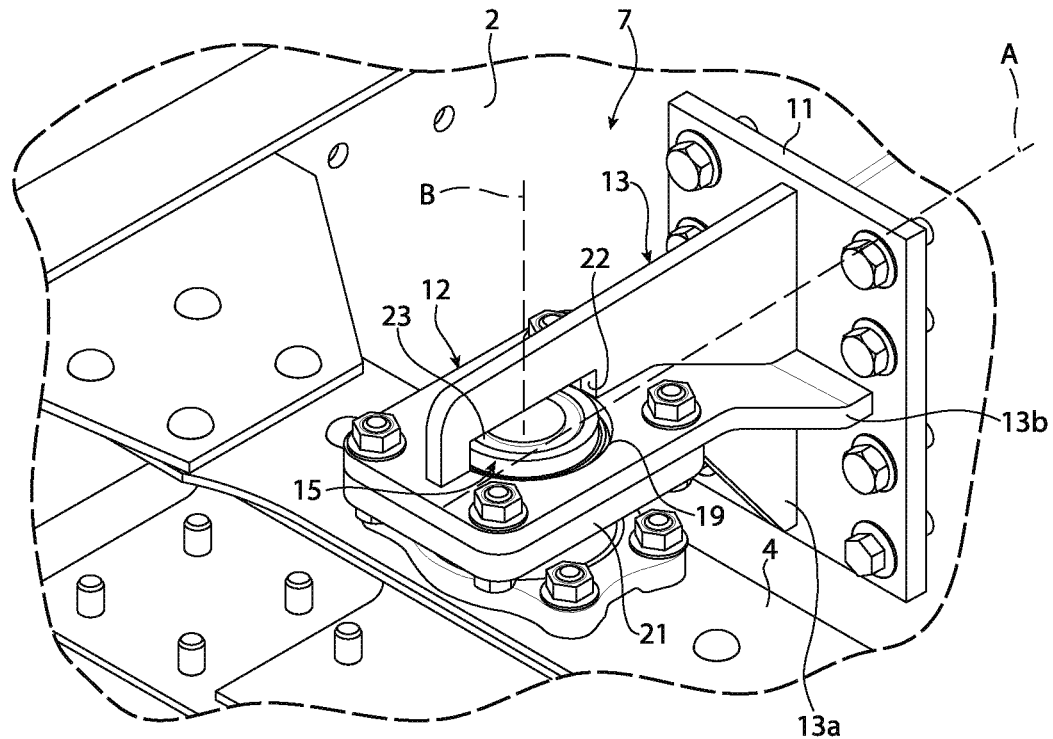
FIG. 19 is a perspective view showing an enlarged view of another element of the support system of FIG. 16.

With initial reference to FIGS. 16, 17, and 18, in various embodiments, a first support element 7 connects a coupling portion, fixable to the alternative fuel module 6, via a movable connection to the cross member 4 while the second support element 8 connects a coupling portion, fixable to the alternative fuel module 6, to the side members 2, 3.

In such embodiments, the second support element 8 is a cross member 9 comprising a pair of lateral elements 9a and an intermediate member 9b. The lateral elements 9a defines a cantilevered support portion 9a' that is supported by a flanged portion 9a" fixed to the respective side member 2, 3. In particular, the flanged portion 9a" is fixed to the side member 2, 3 via fixing means such as threaded elements, e.g. bolts.

Intermediate member 9b may, for example, be fixed on the cantilevered support portion 9a' of the lateral elements 9a via fixing means such as threaded elements, e.g. bolts. In particular, the intermediate member 9b may comprise a coupling plate 9b' that is configured to be coupled, e.g. via fixing means such as threaded elements, to the alternative fuel module 6.

Figure 20:
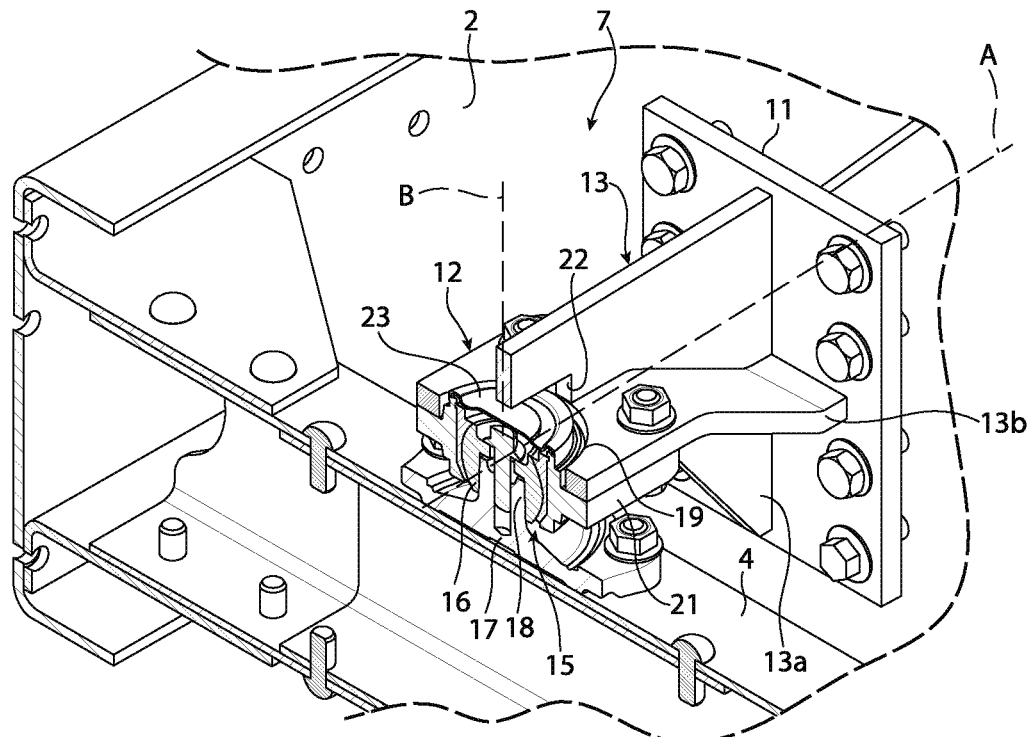
FIG. 20 is a perspective sectioned view showing an enlarged view of the element of FIG. 19.
Figure 21:
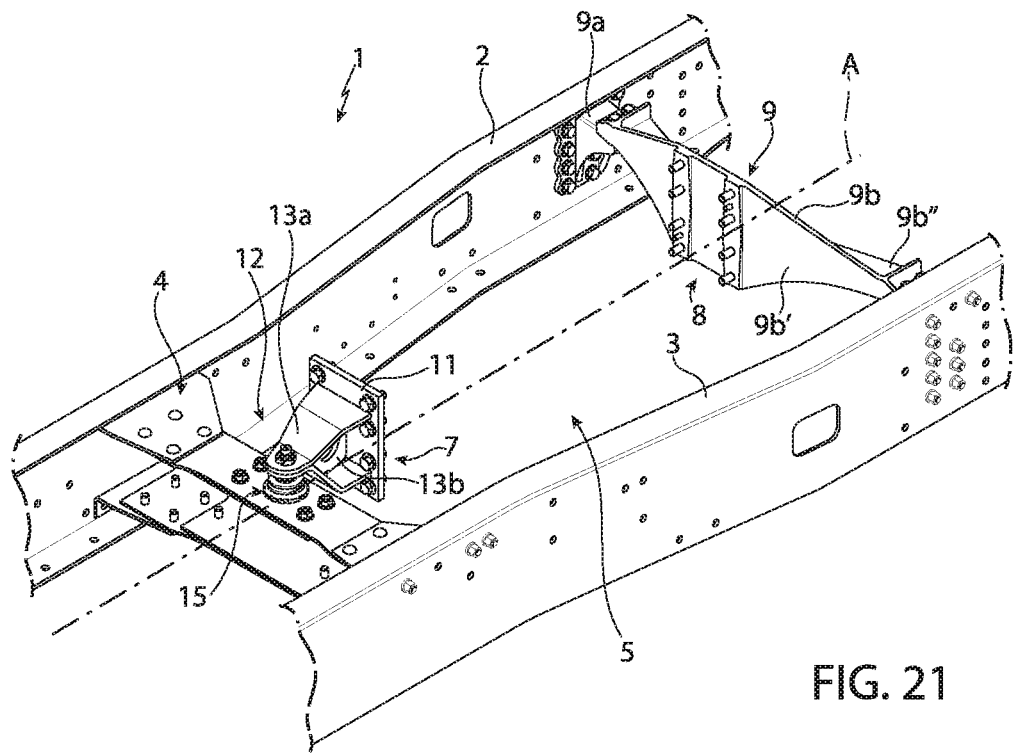
FIG. 21 is a perspective view showing a portion of a vehicle, with parts removed for sake of clarity, comprising a support system in accordance with various embodiments.
Figure 22:
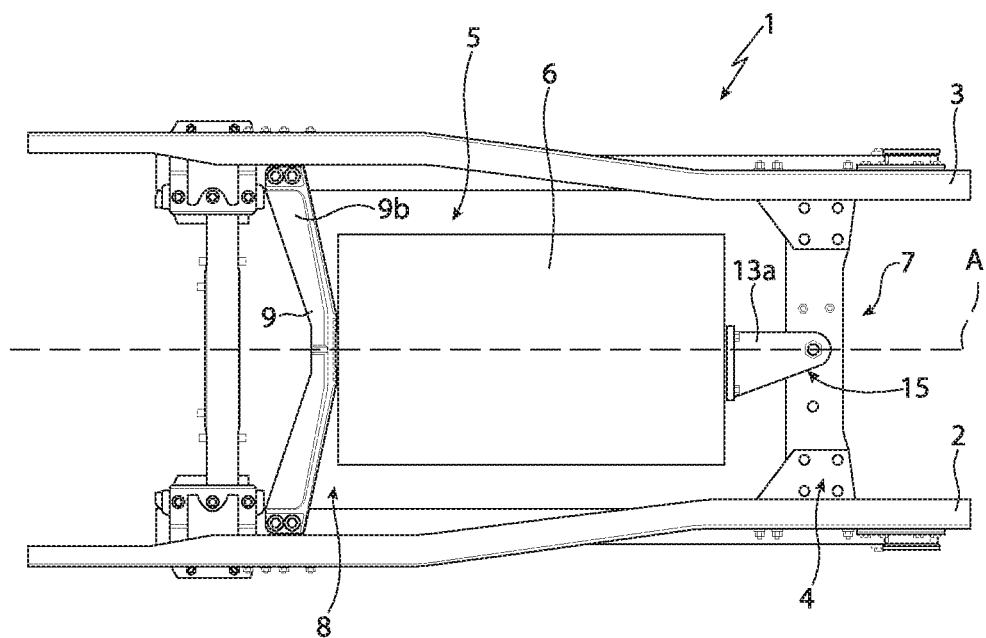
FIG. 22 is a top view showing the vehicle of FIG. 16.
Figure 23:
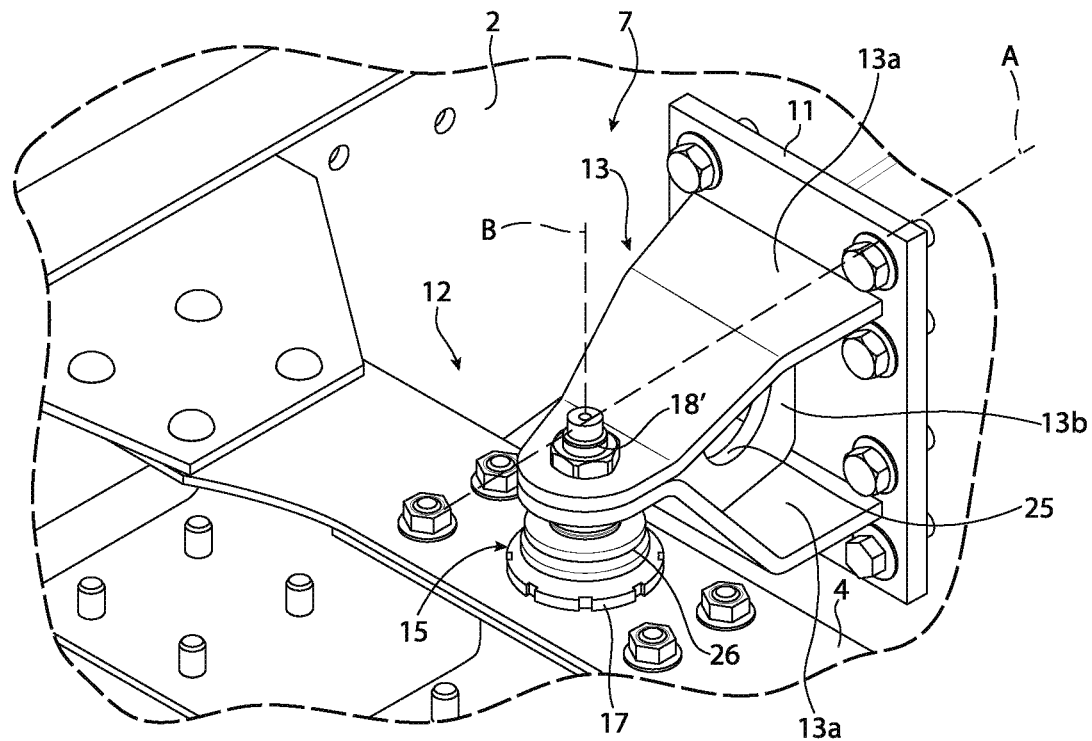
FIG. 23 is a perspective view showing an enlarged view of another element of the support system of FIG. 16.
Figure 24:
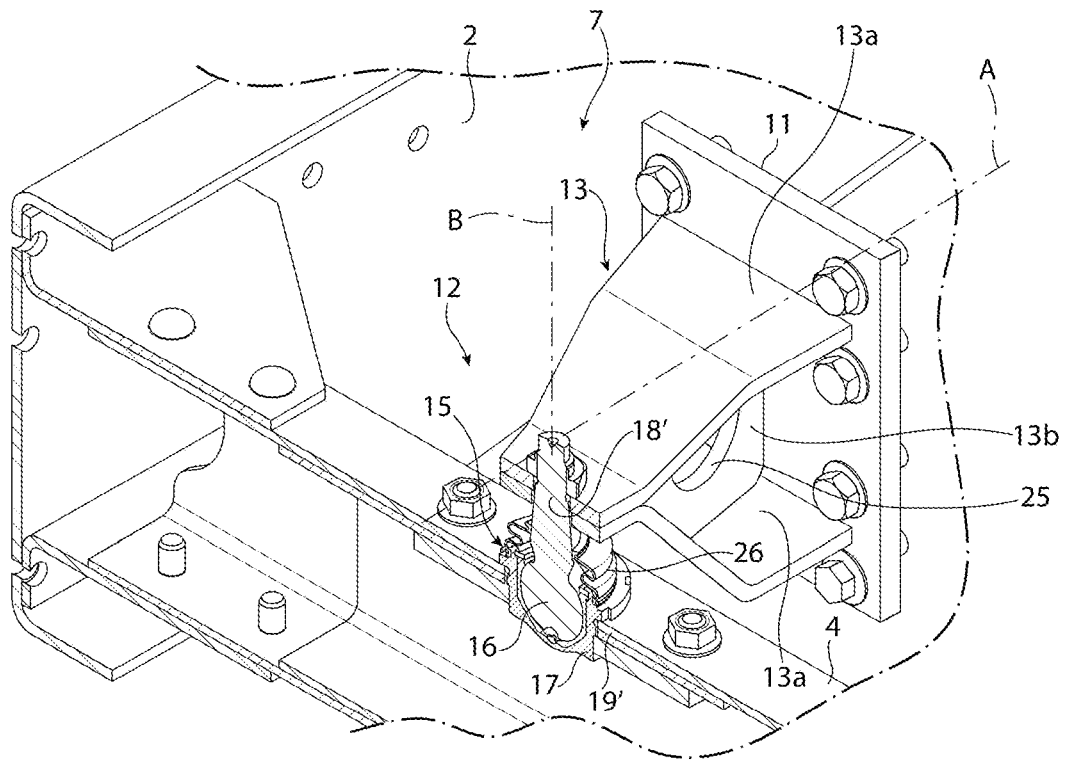
FIG. 24 is a perspective sectioned view showing an enlarged view of the element of FIG. 23.

In various embodiments, coupling plate 9b' is substantially plate and extends on a vertical plane, i.e. a plane orthogonal with respect to longitudinal axis A. Moreover, the coupling plate 9b' may comprise a central portion that is substantially rectangular, e.g. squared and a pair of lateral portion that are tapered in a way to decrease their thickness when approaching to the respective side member 2, 3. In particular, the lateral portions may be inclined with respect to axis A while the central portion is perpendicular to this latter (see FIGS. 17, 20, and 23).

The intermediate member 9b furthermore comprises a pair of reinforcing plates 9b" configured to strengthen the coupling plate 9b'. In particular, each reinforcing plate 9b" comprises a substantially triangular plate that extends, tapered, from the respective side member 2, 3 towards the central portion of the coupling plate 9b'. Preferably, the reinforcing plates 9b" and the coupling plate 9b' are made as a single piece.

Moreover, it is noticed that the reinforcing plates 9b" are placed in a plane perpendicular with respect to coupling plate 9b', i.e. parallel to the plane containing the cantilevered portion 9a' of lateral elements 9a. Accordingly, the intermediate member 9*b* is fixed to the flanged portion 9*a*" via the respective reinforcing plate 9*b*" preferably via a threaded connection, e.g. by bolts.

With reference to FIGS. 16, 18, 19, and 20, in various embodiments, the first support element 7 comprises a coupling plate 11 configured to be fixed to the alternative fuel module 6 and a support bearing 12 configured to be fixed to cross member 4 and to support in a rotatably free manner the coupling plate 11.

Coupling plate 11 may, for example, be fixed to the alternative fuel module 6 via fixing means such as a threaded connection, e.g. by bolts and it is coupled to support bearing 12 via a flanged connection 13 that is fixedly engaged to the coupling plate 11.

In various embodiments, support bearing 12 comprises a ball joint 15. In particular, the ball joint 15 may comprise a sphere 16 that is carried by a support 17 that is fixable to cross member 4, e.g. via threaded elements.

With reference to FIGS. 16 to 20, in various embodiments, sphere 16 is carried by a pin 18 fixedly carried and extending by support 17 and allowing the sphere 16 to be carried about a rotational axis B, for example, a vertical axis, i.e. perpendicular to axis A and to ground.

In particular, the flange 13 comprises a vertical plate portion 13*a* that extends substantially perpendicularly from plate 11 on the opposite side with respect to alternative fuel module and a transversal plate portion 13*b* that extends substantially perpendicularly from plate 11 on the opposite side with respect to alternative fuel module and perpendicularly with respect to vertical plate portion 13*b*. Preferably, flanged connection 13 and plate 11 are monolithic.

The sphere 16 is housed in a sliding way in an opening 19 that is made in a support plate 21 that is connected to flanged portion 13. The sphere 16 is therefore configured to allow the rotation about axis B and in all possible rotational direction transversal thereto thanks to the sliding of its surface in opening 19.

In particular, the support plate 21 is placed lower with respect to transversal plate portion 13*b* of flanged connection and it is connected thereto via connection means such as a treaded connection, e.g. by bolts. In such embodiments, vertical plate portion 13*a* defines an opening 22 above the support plate 21 in correspondence of sphere 16.

In particular, such opening 22 is partially occupied by a cover 23 cooperating at contact with flanged connection 13 and with support plate 21 to isolate the sphere from the environment, i.e. to avoid the passage of dirty elements.

Cover 23 may, for example, be vertically interposed in contact between support plate 21 and transversal plate portion 13*b* to cover the sphere 16 to avoid the passage of dirty elements.

With reference to FIGS. 21 to 24, in various embodiments, sphere 16 is housed in support 17 that is housed in an opening 19' realized in cross member 4. The sphere 16 may further define a pin portion 18' defining a rotation axis B about which the support plate 21 may rotate. The pin portion 18' is fixedly carried by sphere 16 and, therefore, position of rotation axis B may vary according to the rotation of sphere 16.

Flanged connection 13 may further comprise a vertical plate 13*b* that extends substantially perpendicularly from plate 11 on the opposite side with respect to alternative fuel module and a pair of transversal plates 13*a* that extends substantially perpendicularly from plate 11 on the opposite side with respect to alternative fuel module and perpendicularly with respect to vertical plate 13*b*.

In particular, the pair of transversal plates 13*a* comprises an upper and a lower transversal plate 13*a* with respect to vertical plate 13*b* and connected to respectively upper and lower edges thereof.

Transversal plates 13*a* may comprise, for example, a transversal extension that decreases starting from plate 11 to pin 18' and have substantially a trapezoidal shape with a rounded edge in correspondence of pin 18. Transversal plates 13*a* may further define a hole that allows the insertion of pin 18' to allow the rotation of transversal plate about pin 18'.

The upper and lower edge of central plate 13*b* have a variable height so that the vertical extension of the central plate 13*b* near the plate 11 is greater with respect to near the pin 18'. Accordingly, the transversal plate 13*a* varies their vertical position so that they are separated near plate 11 and that they are in contact one with the other about pin 18.

In various embodiments, the upper and lower transversal plates 13*a* are connected together by contact, e.g. via a fixing means such as a threaded connection that externs a compression forces between the two transversal plates 13*a* and that allows vertical coupling between the transversal plates 13 and pin 18'.

The central plate 13*b* further defines a hole 25, preferably passing through the plate and equally spaced with respect to transversal plates 13*a*. Preferably, flanged connection 13 and plate 11 are monolithic and, more preferably, realized in metallic material such as cast iron.

In various embodiments, support system is provided with a cover 26 configured to isolate sphere 16 from the environment while allowing the passage of pin 18' to be coupled to transversal plates 13*a*. Accordingly, cover 26 is placed over support 17 and configured to laterally surrounds pin 18'.

Support systems in accordance with the present disclosure may be sized for different dimensions of vehicles and alternative fuel module, therefore it is versatile. Furthermore, the proposed support system 12 with ball joint 15 may be easily decoupled with respect to coupling plate 10, via flanged connection 13, thanks to the presence of support plate 21. Furthermore, the support system 12 according to second embodiments allows a further degree of movement (movement of rotation axis B).

It is clear that modifications can be made to the described support system which do not extend beyond the scope of protection defined by the claims. For example, as said, first and second support elements 7, 8 may be placed, inversed, in front or rear portion of the vehicle alongside members 2, 3. Generally the proposed shapes of the first and second elements may vary according to the dimensions and typology of vehicle and of the alternative fuel module to be supported.

In view of the foregoing, the advantages of the support system according to the present disclosure are apparent. Support systems in accordance with the present disclosure may provide a cost-effective and weight-reduced three point fixation to the alternative fuel module.

Thanks to such fixation, the alternative fuel module is supported in a decoupled way with respect to the frame 1 thereby avoiding that accelerations and torque may be transmitted to the alternative fuel module. Moreover, the disclosed support system may be sized for different dimensions of vehicles and alternative fuel module, therefore it is versatile. It is clear that modifications can be made to the described support system which do not extend beyond the scope of protection defined by the claims.

What is claimed is:

1. A vehicle having a frame, comprising:
two side members connected together by a cross member;
an alternative fuel module; and
a support system connected to the two side members,
wherein the support system comprises a first support element and a second support element, both the first and the second support elements fixedly connected to the alternative fuel module via a coupling portion,
wherein the coupling portion of the second support element is fixedly connected to the two side members,
wherein the coupling portion of the first support element is connected to the cross member by a movable connection, and
wherein the vehicle further comprises a support bearing comprising a plummer block which houses a shaft that is fixedly coupled to the coupling portion of the first support element.

2. A vehicle having a frame, comprising:
two side members connected together by a cross member,
an alternative fuel module; and
a support system connected to the frame for supporting the alternative fuel module,
wherein the support system comprises a first support element and a second support element, both the first support element and the second support element fixedly connected to the alternative fuel module via a respective coupling portion,
wherein the coupling portion of the second support element is connected via an elastic connection to the two side members, and
wherein the coupling portion of the first support element is connected to the cross member via a movable connection.

3. The vehicle of claim 2, wherein the movable connection comprises a ball joint comprising a sphere housed in a sliding manner in an opening between the cross member and the coupling portion.

4. The vehicle of claim 2, wherein the first support element comprises at least one rib reinforcing the coupling of the flange to the coupling portion.

5. The vehicle of claim 2, wherein the coupling portion is part of a transversal member extending across a longitudinal axis (A) of the frame,
wherein the elastic connection comprises at least one lateral element of the transversal member defining a cantilevered portion and a flanged portion carried by the two side members, and
wherein the coupling portion is fixed to the cantilevered portion.

6. The vehicle of claim 5, wherein the at least one lateral element comprises a fixing portion fixed to the two side members, and
wherein the flanged portion is elastically carried by the fixing portion.

7. A vehicle having a frame, comprising:
two side members;
a cross member connected to the two side members;
an alternative fuel module; and
a support system connected to the frame and the alternative fuel module,
wherein the support system comprises at least a first support element and a second support element each fixedly connected to the alternative fuel module via a respective coupling portion,
wherein the coupling portion of the second support element is connected to the two side members,
wherein the coupling portion of the first support element is connected to the cross member via a movable connection, and
wherein the movable connection comprises a ball joint connected via a support portion to the cross member.

8. The vehicle of claim 7, wherein the ball joint comprises a support plate that is connected to the support portion and that is connected to a flanged connection carried by the coupling portion.

9. The vehicle of claim 8, wherein the ball joint comprises a sphere carried by the support portion, and
wherein the sphere is housed in a sliding manner in an opening in the support plate and in the flanged connection.

10. The vehicle of claim 8, wherein the flanged connection comprises a transversal plate element placed vertically over the support plate and fixed to the support plate via a threaded connection,
wherein the flanged connection comprises a vertical plate element perpendicular with respect to the transversal plate element, and
wherein the vertical plate element, the transversal plate element, and the support element are realized as one piece.

11. The vehicle of claim 9, wherein the ball joint comprises a pin fixedly carried by the sphere, the pin being housed in an opening in the flanged connection, and
wherein the flanged connection comprises a pair of transversal plates vertically placed one with respect to the other and axially in contact with and defining an opening through which the pin may pass to allow the rotation of the flanged connection about the pin.

12. The vehicle of claim 7, wherein the coupling portion is part of a transversal member extending across an axis (A), the transversal member comprising at least one lateral element defining a cantilevered portion and a flanged portion carried by the side two members,
wherein the coupling portion is fixed to the cantilevered portion, and
wherein the transversal member comprises at least one reinforcing plate extending perpendicularly from the coupling portion and fixed to the cantilevered portion.

* * * * *